United States Patent
Riccio

[15] 3,687,525
[45] Aug. 29, 1972

[54] REMOTE CONTROLLED MIRROR
[72] Inventor: Victor D. S. Riccio, 7722 Atlantic Ave., Cudahy, Calif. 90201
[22] Filed: Nov. 17, 1970
[21] Appl. No.: 90,352

[52] U.S. Cl. .................................. 350/289, 60/57 T
[51] Int. Cl. ............................ G02b 5/08, B60r 1/06
[58] Field of Search .................... 350/289; 60/57 T

[56] References Cited
UNITED STATES PATENTS
3,005,384  10/1961  Baird et al. ................ 350/289
2,471,109  5/1949  Hunt .......................... 60/57 T Primary Examiner—David Schonberg
Assistant Examiner—John W. Leonard
Attorney—Charles G. Lyon et al.

[57] ABSTRACT

A pneumatically powered apparatus is provided for rotating a vehicular side view mirror through control mechanism located within the vehicle. The apparatus includes a frame mounted on the side of the vehicle, means associated with the frame for pivotally supporting the mirror, a gear train associated with the frame provided with an input shaft and output shaft, means responsive to the rotation of the output shaft for rotating the mirror, a blower wheel connected to the input shaft, a source of pressurized fluid, a conduit for connecting the pressurized fluid source to a 3-way control valve within the vehicle, and conduits leading from the control valve to the blower wheel for directing air to the wheel whereby such may be rotated in a selected direction.

2 Claims, 6 Drawing Figures

INVENTOR.
VICTOR D. S. RICCIO
BY Donald Diamond
ATTORNEY

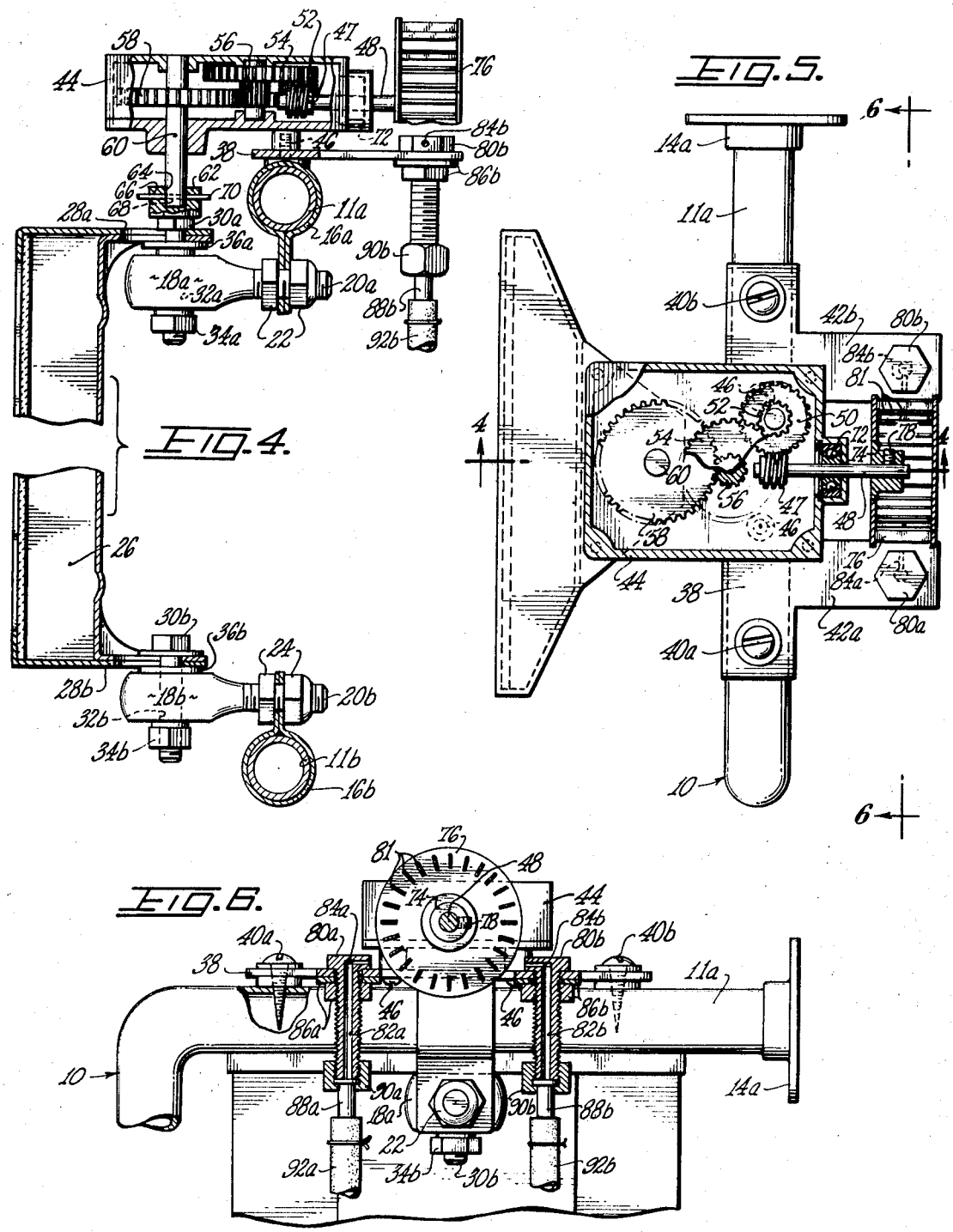

REMOTE CONTROLLED MIRROR

BACKGROUND OF THE INVENTION

This invention relates to side view mirrors for vehicles and, more particularly, to a remote controlled, pneumatically powered, apparatus for rotating a mirror mounted on the right hand side of a vehicle in which the controls therefor are located within the vehicle.

Although truck cabs are manufactured with rear windows, the use of a rear view mirror mounted within the cab is often impaired because of the height and width of the load behind the cab. Therefore, stationary mirrors are mounted on the left and right hand sides of the truck cab in order to permit the driver to have rearward vision which is independent of the availability of vision through the back window of the truck cab.

However, there are situations where the effectiveness of the stationary mirrors and, particularly the right hand side mirror, are severely impaired. For example, when the driver of a semi-trailer truck or double-trailer truck is making a relatively sharp right or left turn, the stationary mirror mounted on the truck cab will have the same angle with respect to the trailer as that assumed by the cab. This is not particularly serious insofar as the left hand side of the trailer is concerned, since the driver, if he so desires, can extend his head out the open window and see the entire length of the trailer. In contrast to the left hand turn, when a right hand turn is being made, the driver, of course, is not in a position to look out the right hand window and, since the mirror will reflect back towards the mid-section of the trailer, the driver cannot tell the exact position of the rear of the trailer.

Also, in the case of other kinds of trucks, as, for example, ready-mix cement trucks where the chute is extended to the right for unloading, the stationary right hand mirror does not permit the drive to view the end of the chute. In the pouring of cement from a ready-mix truck for the construction of curb and gutter, the driver moves the truck forward at the signal of the chute man in order to avoid accumulation of excess cement. At the present time, the chute man signals by voice or whistle which is often difficult for the driver to hear in view of the noise of the motor, the distance between the driver and the chute man, and the general noise in the construction area.

Accordingly, it would be advantageous to provide an apparatus, with control means within the cab, for selectively rotating the right hand side mirror to permit rearward vision laterally of the rear of the vehicle as required.

PRIOR ART

In the prior art, U.S. Pat. No. 3,480,355 -Smith, is directed to a remote controlled, pneumatically powered apparatus with a controllable limit stop for rotating the right hand side mirror in order to enhance rearward vision along the right side of the vehicle. The apparatus includes a pneumatic powered, spring returnable, piston rod for rotating the mirror via a connecting arm pivotally attached to the mirror; a controlled stop for limiting the stroke of the piston; and separate controls in the cab for operating the piston and the stop. In addition, a regulator is required to reduce the air pressure from the compressed air reservoir to between five to ten pounds per square inch. The apparatus disclosed in U.S. Pat. No. 3,480,355, while making use of the compressed air reservoir carried by trucks, requires the use of multiple controls, a regulator for reducing air pressure and only provides selective control means for rotating the mirror in one direction with spring means being used for returning the mirror to its original position.

OBJECTS

Accordingly, it is an object of this invention to provide a new and improved remote controlled mirror.

Another object of this invention is to provide a remote controlled mirror of the character described which can be selectively operated to rotate the mirror in either a right hand or left hand direction to any desired angle.

A further object of this invention is to provide a remote controlled mirror of the character described which can be selectively operated with respect to the speed at which the mirror rotates. A still further object of this invention is to provide a remote controlled mirror of the character described, which can be quickly and easily operated and which will function in all types of weather conditions.

Yet another object of this invention is to provide a remote controlled mirror of the character described which is easy to manufacture, quickly installed, capable of long extended usage without mechanical breakdown, and is otherwise ideally suited to its intended purpose.

SUMMARY OF THE INVENTION

In accordance with this invention, there is provided a remote controlled mirror for a vehicle which includes a frame mounted on the side of a vehicle, gear means provided with rotatable input and output shafts associated with the frame, means associated with the frame for pivotally supporting the mirror, means responsive to the rotation of the output shaft for rotating the mirror, and means for rotating the input shaft including selective control means therefor located within the vehicle.

DESCRIPTION OF THE DRAWINGS

FIG. 4 is a longitudinal cross-sectional view along line 4—4 of FIG. 5 showing the assemblies for pivotally supporting the mirror, the gear train and the blower wheel.

FIG. 5 is a top plan view of the gear train and blower wheel.

FIG. 6 is a longitudinal cross-sectional view along line 6—6 of FIG. 5 showing the relationship between the air jets and the blower wheel.

DETAILED DESCRIPTION

Figure 1:
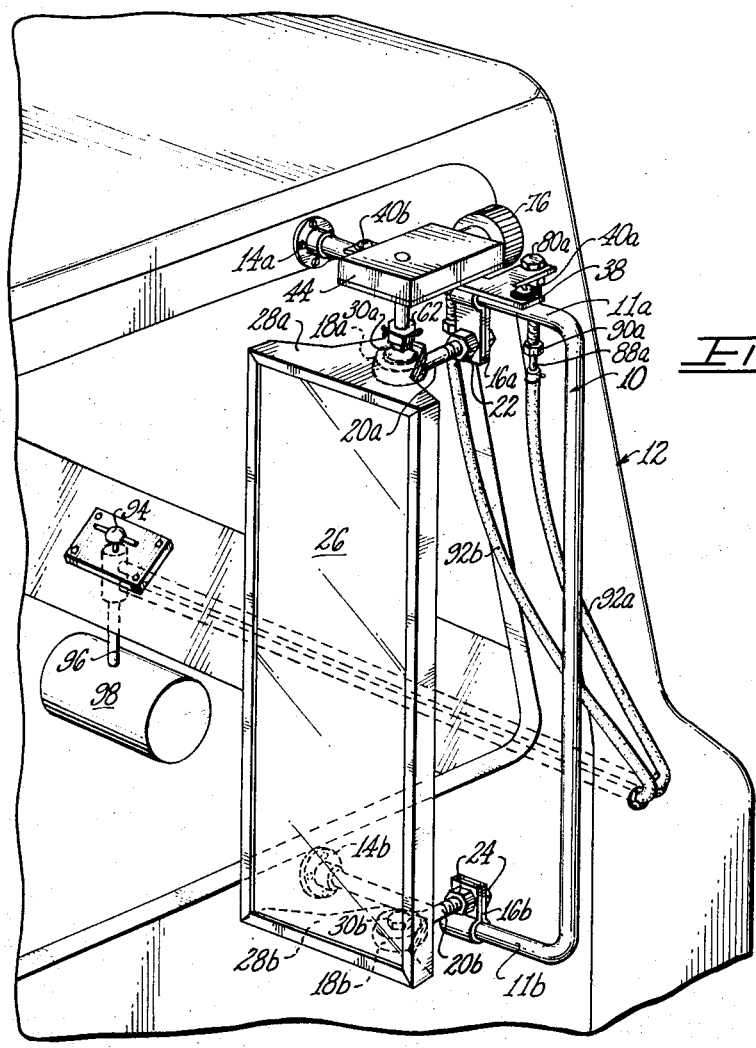
FIG. 1 is a fragmentary perspective view of the remote controlled mirror attached to a truck cab.
Figure 2:
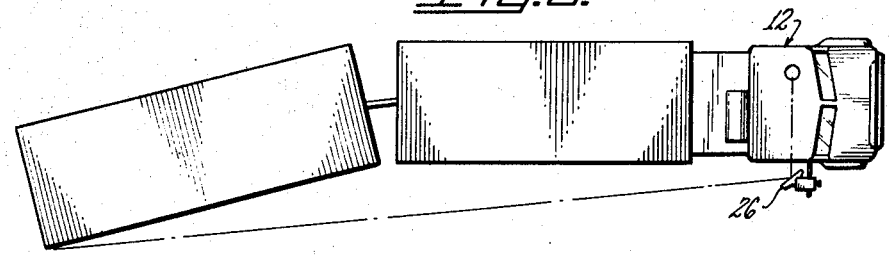
FIG. 2 is a top plan view of a double-trailer truck making a right hand turn with the remote controlled mirror adjusted to permit the driver to view the area in the vicinity of the right rear portion of the last trailer.
Figure 3:
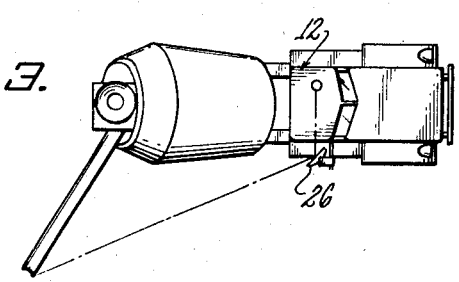
FIG. 3 is a top plan view of a ready-mix cement truck with the remote controlled mirror adjusted to permit viewing of the end of the unloading chute which is extended to the right of the truck.

Referring to FIG. 1, a mirror support frame 10, provided with an upper leg 11a and a lower leg 11b, is attached to a truck cab 12 through a pair of mounting brackets 14a and 14b.

Upper and lower clamps 16a and 16b, are mounted on the upper and lower legs, respectively, of the frame 10. Upper and lower swivel bearings 18a and 18b have threaded shafts 20a and 20b which extend through transverse openings in the upper and lower clamps and are held in place by a pair of locking nuts 22 and 24 disposed on each side of the clamps.

A mirror 26 is provided with upper and lower laterally extending brackets 28a and 28b, each of which has a transverse opening. A first pivot bolt 30a extends through the transverse opening of the upper mirror bracket and through the opening 32a of the upper swivel bearing. A second pivot bolt 30b extends through the transverse opening of the lower mirror bracket and through the opening 32b of the lower swivel bearing. The first and second pivot bolts are held in place by locking nuts 34a and 34b. Washers 36a and 36b are positioned intermediate the mirror brackets and the bolt heads.

A mounting bracket 38 is disposed along the top of the upper leg 11a of the mirror supporting frame 10 and is fastened to the frame by a pair of sheet metal screws 40a and 40b. The mounting bracket is provided with a pair of laterally extending arms 42a and 42b.

A gear box 44 is fastened to the mounting bracket 38 by a pair of screws 46 which pass upwardly through openings in the bracket to threadedly engage a corresponding pair of internally threaded nipples which extend downwardly from the bottom of the gear box. The gear box contains a gear train which includes a worm gear 47 and worm gear input shaft 48, a compound worm wheel gear consisting of worm wheel 50 and worm wheel pinion 52, a compound idler gear consisting of idler gear 54 and idler gear pinion 56, and a driven gear 58 which is coupled to an output shaft 60. In this gear train, worm gear 47 engages worm wheel 50, and worm wheel pinion 52, which is above worm wheel 50, engages idler gear 54; and idler gear pinion 56 which is below idler gear 54 engages the driven gear.

An adapter head 62 is connected by a weld or other suitable means to the head of the first pivot bolt 30a. The adapter head is provided with a vertical opening 64 which extends less than the vertical length of this head. The adapter head is also provided with a transverse opening 66 which extends completely through the adapter head and which is located between the top of the adapter head and the plane which transverses the bottom of the vertical opening.

The output shaft of the gear train extends below the bottom of the gear box and near its downward end is provided with a transverse opening 68. The downward end of the output shaft is seated in the vertical opening of the adapter head and the transverse openings thereof are aligned and held in place by means of a cotter pin 70.

The input shaft 48 of the gear train rotates in a ball bearing 72 attached to the gear box and is connected to the center hub 74 of a cylindrical blower wheel 76 by means of a set screw 78.

A pair of air jets 80a and 80b are positioned on opposite sides of the blower wheel for directing an air stream against the vanes 81 of the blower wheel whereby the blower wheel may be rotated in either the right hand or left hand direction. The air jets are preferably positioned such that the air stream impinges on the air vanes at an angle of about 45°. In the embodiment shown in the drawings, the air jets comprise threaded bolts provided with longitudinally tapped holes 82a and 82b which communicate with transverse openings 84a and 84b in the bolt heads; but it will be recognized that the exact form of the air jet is not critical.

The air jets are supported by the laterally extending legs of the mounting bracket 38 and held in place by locking nut and washer assemblies 86a and 86b. Copper tubes 88a and 88b flanged at one end are connected at the flanged ends to the inlet ports of the air jets by appropriate locking nuts 90a and 90b. The other ends of the copper tubes 88a and 88b are connected to air hoses 92a and 92b, respectively, by appropriate clamps. The hoses, in turn, are connected to a three-way valve 94 mounted in the vehicle cab within reach of of the driver. The hoses are advantageously connected to the three-way valve such that rotation of the valve handle to the right will result in the mirror moving in a right hand direction while rotation of the valve handle to the left will cause the mirror to move in a left hand direction.

A conduit 96 connects a compressed air reservoir 98 to the three-way valve. The compressed air reservoir or tank is used for supplying air to operate the air brakes on the truck and is usually maintained at an air pressure of about 120 pounds per square inch. In practicing this invention, the air may be used as supplied by the air tank and no reducing regulator is required. However, in order to effectively operate the apparatus of this invention, the air should be at least about 60 pounds per square inch and good results are attained when the air is at a pressure of about 100 pounds per square inch. The design of the blower wheel and gear train are such that when operated by air from the air tank there will be imparted a rotational speed to the mirror from about 1 to 7 revolutions per minute. The rate at which the mirror rotates can be selectively controlled by the driver by appropriate manipulation of the three-way air valve. These results can be obtained by using a 2-inch (outside diameter) blower wheel in combination with a worm gear train manufactured by Bevel Products Corporation of Carlstadt, N.J. 07072 and identified as Series 'L', Type 'LB'. In this gear train, the gear ratio is such that 3,000 revolutions of the worm gear are required for each complete revolution of the output shaft. However, effective results are obtained when the gear ratio is such that from about 2,000 to 3,000 revolutions of the worm gear are required for each complete revolution of the output shaft.

In actual operation, the valve handle, for example, is rotated or turned to the right whereupon air from the air tank 98 passes through conduit 96, air valve 94, hose 92a, air jet 80a and impinges on air vanes 81 of blower wheel 76 causing the blower wheel to rotate in a counter-clockwise direction.

The center hub 74 of the blower wheel, which is connected to the worm gear input shaft 48 by means of a set screw 78, rotates the input shaft in a counter-clockwise direction resulting in the following sequence of rotations in the remainder of the gear train: the compound worm wheel 50 and pinion 52 rotate counter-clockwise, the compound idler gear 54 and pinion 56 rotate clockwise and the driven gear 58 together with the output shaft 60 rotate counter-clockwise. The counter-clockwise rotation of the output shaft will cause the mirror to rotate counter-clockwise or in a right hand direction with respect to the driver.

The above-described rotations of the blower wheel and gear train are reversed when the handle on the three-way air valve is rotated or turned to the left resulting in the mirror rotating clockwise or in a left hand direction with respect to the driver.

In view of the gear ratio of the gear train, the rotation of the mirror will promptly stop upon moving the valve handle to the off position.

Thus, the objects of this invention have been accomplished, namely, a new and improved remote controlled mirror has been provided which can be quickly, easily and selectively operated with respect to direction and speed of rotation and which is easy to manufacture, quickly installed and capable of long extended usage without mechanical breakdown.

While in the foregoing drawing and description there has been shown and described the preferred embodiment of this invention, it will be understood, of course, that minor changes may be made in the combination and arrangement of parts without departing from the spirit and scope of the invention as claimed.

I claim:

1. In a remote controlled mirror for a vehicle having a conventional mirror, frame for securing the mirror to said vehicle and compressed air supply, the improvement comprises:

gear means associated with said frame, said gear means being provided with a rotatable input shaft and a rotatable output shaft whereby rotation of said input shaft causes rotation of said output shaft, means associated with said frame for pivotally supporting said mirror, means responsive to the rotation of the output shaft for rotating said mirror, and means for rotating said input shaft, said means, for rotating said input shaft comprising a blower wheel secured to said input shaft and means for directing air pressure against said wheel thereby effecting rotation of said blower wheel, said directing means being carried by said frame and communicating with said compressed air supply and a selective control value for regulating the fluid flow from said compressed air supply to said directing means.

2. The combination of claim 1 further including air flow means connecting said compressed air reservoir to said selective control valve, first air conduit means coupled at one end to said selective control valve and terminating at the other end in a first jet port, second air conduit means coupled at one end to said selective control valve and terminating at the other end in a second jet port, said first jet port being positioned for directing pressurized air against said blower wheel for rotating said blower wheel in one direction and said second jet port being positioned for directing compressed air against said blower wheel for rotating said blower wheel in the opposite direction.

* * * * *